Patented Feb. 10, 1953

2,628,174

UNITED STATES PATENT OFFICE 2,628,174

METHOD OF PREPARING PROTECTIVE CLOTHING

Arthur J. Stokes and Homer W. Carhart, Washington, D. C.

No Drawing. Application October 9, 1943, Serial No. 505,648

8 Claims. (Cl. 117—121)

(Granted under Title 35, U. S. Code (1952), sec. 266)

This invention relates to the production of chloramide impregnated materials, and it is particularly concerned with the preparation of protective clothing.

It has been found that the most practical protective clothing against such vesicants as mustard gas, which may be worn for long periods of time, comprise fabrics and other porous or fibrous materials impregnated with chloramides. The application of chloramides to fabrics by conventional aqueous methods requires the use of binders to fasten the chloramide particles to the fibers, and necessitates the use of various dispersing and deflocculating agents in order to incorporate the insoluble chloramide into a stable emulsion suitable for fabric impregnation. Further difficulties have been encountered in producing chloramides of fine enough particle size to form stable emulsions.

This invention provides a method for impregnating porous materials, particularly clothing, with chloramides which is free from the above-mentioned drawbacks inherent in conventional methods. It requires no added binding or dispersing agents (although in some cases binders may be advantageously used) and eliminates the use of colloid mills, grinding mills and the like needed to formulate emulsions.

The method of this invention comprises, briefly, impregnating the material to be treated with a suitable amide and then converting the amide to the chloramide in situ by addition of chlorine. The chlorine may be applied to the impregnated material either in the form of a gas or by means of chlorinating agents, such as chlorine saturated water, hypochlorous acid, alkali hypochlorites and the like.

In practice there are four variations of the process which may be employed:

(1) An amide may be used which is water-soluble and which can be applied directly to the material to be impregnated from aqueous solutions of the desired concentration, followed by chlorination.

(2) An amide may be used which is not water-soluble, but which possesses certain acid water solubilizing groups such as carboxyl, sulfonic, etc. This type of amide is rendered water-soluble by means of its soluble metal salts, ammonium salts and salts of organic bases. The impregnation of materials with aqueous solutions of these salts and the chlorination of the amide is carried out in the same manner as with the water-soluble amides.

(3) An amide may be used which is not water-soluble, but which possesses a basic group or groups which can be caused to react with acid substances to produce a water-soluble salt. Aqueous solutions of these amide salts may be used for impregnation and chlorination in the manner described.

(4) Where the amide can not be made to form an aqueous solution, it may be dissolved in some organic solvent, such as ethers, alcohols, ketones, hydrocarbons, etc., to form a solution which is used to impregnate the porous material. After removal of solvent the impregnated material is wet so that the chlorination reaction may proceed.

The acidity or alkalinity of the impregnating solution containing the amide may be varied quite widely by the addition of an excess of the reagent used in forming the salt of the amide. It is desirable, however, to use neutral impregnating solutions for treatment of fabrics to avoid a weakening of the fabric and to minimize corrosion of the impregnating equipment.

The amides which are suitable for use in this invention are those which will react with chlorine or a chlorinating agent at atmospheric pressure and temperature, for although almost any amide can be chlorinated at high enough temperatures and pressures there is no practical advantage over conventional methods of preparing protective clothing, etc., if drastic means for chlorination are required. These are many well known amides of wide variety which can easily be chlorinated at room temperatures and pressure. A partial list of representative compounds of this class is as follows:

7,8-diphenyl glycoluril
7,8-dimethyl glycoluril
2,5-diimino-7,8-diphenyl glycoluril
5,5-diphenyl hydantoin
5,5-diphenyl-2-imino hydantoin
5,5-dimethyl hydantoin
p-toluene sulfonamide
Methane sulfonamide
Acetanilide
Dibenzoyl ethylene diamine
2-phenyl-4,6-diamino triazine
2,4-diketotetrahydro quinazoline
Phthalimide
Benzimidazoline The chlorination of the amides takes place equally well whether the amide is chlorinated on the fabric in the form of its hydrochloride, sulfate, acetate or other acid or base metal salt, or whether the amide is converted to the free base on the fabric by appropriate treatment prior to chlorination. In the normal course of impregnation of clothing or cloth, the fabric is wrung out or passed between rollers to remove excess solution prior to exposure to chlorine gas because excess water prevents complete chlorination of the amide. It is believed that this is due to the precipitation of the chloramide in the water at the liquid-gas interface and consequent "sealing off" of the amide in the interior of the liquid. Of course, where the chlorine is furnished to the amide in the form of hypochlorous acid or a solution of a hypochlorite the quantity of amide solution allowed to remain on the fabric is less important.

The chlorination of the amide impregnated material may be carried out by treating the latter with an aqueous solution of a chlorinating agent, such as chlorine water, hypochlorous acid, or aqueous solutions of hypochlorites, etc., or the wet material may be placed in a chamber filled with chlorine gas. The material is allowed to remain in contact with the chlorine or chlorinating agent until the amide is precipitated in the pores or around the fibers of the material as the chloramide. After the chlorination the material, especially clothing, is thoroughly rinsed in water to remove unreacted chlorine, hypochlorous acid, hydrochloric acid and salt decomposition products in the case of amides impregnated in some form other than the free base.

The following examples illustrate typical embodiments of the invention:

*Example 1*

An impregnating solution was made by dissolving 14 grams of 2,5-diimino-7,8-diphenyl glycoluril in 200 milliliters of water by the addition of about 8 milliliters of concentrated hydrochloric acid. This resulted in a clear, neutral solution of 2,5-diimino-7,8-diphenyl glycoluril dihydrochloride. A strip of cotton cloth was thoroughly wetted with this impregnating solution, wrung out as much as possible, then suspended for 15 minutes in a chamber filled with chlorine gas at room temperature and pressure. The cloth was then rinsed thoroughly in water, and dried. The active chlorine content of the fabric was about 0.6 milligram per square centimeter.

*Example 2*

A piece of cotton cloth was impregnated exactly as in Example 1. The impregnated cloth was given a rinse in a 5 per cent aqueous solution of sodium hydroxide and then chlorinated for 15 minutes in gaseous chlorine. This was followed by a thorough rinsing and drying. The active chlorine content of the fabric was about 0.7 milligram per square centimeter.

*Example 3*

An impregnating solution was made by dissolving 10 grams of 5,5-diphenyl-2-imino hydantoin in 200 milliliters of water by the addition of sufficient concentrated hydrochloric acid to form a neutral solution of the hydrochloride. A strip of cotton cloth was impregnated with this solution, wrung out as much as possible, and then suspended in a chamber of chlorine gas at room temperature and pressure for 15 minutes. The cloth was removed, rinsed well, and dried. The active chlorine content of the fabric was about 0.4 milligram per square centimeter.

*Example 4*

An impregnating solution was made by dissolving 20 grams of 2,5-diimino-7,8-diphenyl glycoluril in 200 milliliters of water by the addition of 11 milliliters of concentrated hydrochloric acid. A strip of cotton cloth was impregnated with this solution, wrung out as much as possible, and then suspended in a chamber of chlorine gas for 20 minutes. The cloth was rinsed thoroughly in water and dried. The active chlorine content of the fabric was about 1.1 milligrams per square centimeter.

*Example 5*

A strip of cotton cloth was impregnated with a hot, saturated aqueous solution of acetanilide. The excess solution was removed by wringing the cloth. Chlorination of the moist cloth by chlorine gas for 25 minutes, followed by a thorough rinsing in water and drying, produced a chloramide impregnated fabric containing 0.17 milligram of active chlorine per square centimeter.

*Example 6*

An impregnating solution was made in the following manner: 7 grams of 2,4-diketo-tetrahydro quinazoline was dissolved in 200 milliliters of warm water by the addition of about 15 milliliters of a 25 per cent aqueous solution of sodium hydroxide. A strip of cotton cloth was impregnated with this solution, wrung out as much as possible and then exposed to chlorine gas for 25 minutes. The cloth was rinsed well in water and dried. An active chlorine content of 0.22 milligram per square centimeter was obtained.

*Example 7*

A strip of cotton cloth was impregnated with a hot glacial acetic acid solution of 7,8-diphenyl glycoluril and the solvent allowed to evaporate. The impregnated fabric was moistened with water and suspended in chlorine gas for 20 minutes followed by a thorough rinsing in water and drying. The active chlorine content of the fabric was about 0.32 milligram per square centimeter.

*Example 8*

An impregnating solution was prepared in the following manner: 100 grams of 2,5-diimino-7,8-diphenyl glycoluril was dissolved in one liter of water by the addition of about 55 milliliters of concentrated hydrochloric acid. A strip of cotton cloth was impregnated and then placed in a 1% solution of sodium hypochlorite for five minutes. This was followed by a thorough rinsing in water and drying. The active chlorine content of the fabric was about 0.42 milligram per square centimeter.

*Example 9*

An impregnating solution was prepared by dissolving 10 grams of 2,5-diimino-7,8-diphenyl glycoluril in 200 milliliters of water containing 6 milliliters of concentrated hydrochloric acid. A strip of cloth was impregnated with the resulting clear solution, wrung out, and then placed in freshly prepared chlorine water for five minutes. This was followed by a thorough rinsing in fresh water and drying. The active chlorine content of the fabric was about 0.22 milligram per square centimeter.

*Example 10*

An impregnating solution was prepared by dissolving 5 grams of 5,5-diphenyl-2-imino hydantoin in 100 milliliters of water by the addition of about 3 milliliters of concentrated hydrochloric acid. A strip of cloth was impregnated with this solution, wrung out, and then placed in strong chlorine water for 5 minutes. This was followed by a thorough rinsing in water and drying. The active chlorine content of the fabric was about 0.4 milligram per square centimeter.

Many variations will be apparent to those skilled in the art, and the invention should not be limited other than as defined by the appended claims.

The invention described herein may be manufactured and used by or for the Government of the United States of America for governmental purposes without the payment of any royalties thereon or therefor.

We claim:

1. A method of preparing protective clothing which comprises impregnating the clothing with an aqueous solution of a heterocyclic imine selected from the group consisting of a 7,8-diaryl glycoluril, a 2,5-diimino-7,8-diaryl glycoluril, a 5,5-diaryl hydantoin and a 2-imino-5,5-diaryl hydantoin and treating the impregnated clothing with a chlorinating agent while it is wet.

2. The method as claimed in claim 1, wherein the impregnated clothing is treated by exposure to chlorine gas.

3. Method of preparing protective clothing which comprises preparing an aqueous solution of 7,8-diphenyl glycoluril, impregnating said clothing with said solution and treating the impregnated clothing with a chlorinating agent while said glycoluril is wet.

4. Method as claimed in claim 3 wherein said impregnated clothing is treated by exposure thereof to chlorine gas.

5. Method of preparing protective clothing which comprises preparing an aqueous solution of 2,5-diimino-7,8-diphenyl glycoluril, impregnating said clothing with said solution and treating the impregnated clothing with a chlorinating agent while said glycoluril is wet.

6. Method as claimed in claim 5 wherein said impregnated clothing is treated by exposure to chlorine gas.

7. Method of preparing protective clothing which comprises preparing an aqueous solution of 2-imino-5,5-diphenyl hydantoin, impregnating said clothing with said solution and treating the impregnated clothing with a chlorinating agent while said hydantoin is wet.

8. Method as claimed in claim 7 wherein said impregnated clothing is treated by exposure to chlorine gas.

ARTHUR J. STOKES.
HOMER W. CARHART.

REFERENCES CITED

The following references are of record in the file of this patent:

UNITED STATES PATENTS

| Number | Name | Date |
|---|---|---|
| 2,130,805 | Levine | Sept. 20, 1938 |
| 2,234,091 | Sharples | Mar. 4, 1941 |
| 2,311,507 | Arthur | Feb. 16, 1943 |

FOREIGN PATENTS

| Number | Country | Date |
|---|---|---|
| 496,734 | Great Britain | Dec. 5, 1938 |

OTHER REFERENCES

Berichte der Deutchen Chemischen Gesellschaft, Jahrg. 43 (1910), pages 1984–1996.